United States Patent [19]

Irby

[11] 4,166,488

[45] Sep. 4, 1979

[54] TWIRL QUILL DRILL

[76] Inventor: Holcomb B. Irby, 1304 Kentwood Dr., Mountain Home, Ark. 73653

[21] Appl. No.: 799,541

[22] Filed: May 23, 1977

[51] Int. Cl.$^2$ .............................................. B25G 1/12
[52] U.S. Cl. ................................. 145/61 G; 81/177 G
[58] Field of Search ............. 81/177 G, 177 R, 177 B; 145/50 R, 50 C, 61 R, 61 C, 61 G, 116 R; 279/102, 103

[56] References Cited

U.S. PATENT DOCUMENTS

| | | | |
|---|---|---|---|
| 1,403,977 | 1/1922 | Rockwood et al. | 145/61 G |
| 2,324,839 | 7/1943 | Haumerson | 145/50 R X |
| 2,351,705 | 6/1944 | Prall | 145/61 G |

Primary Examiner—James L. Jones, Jr.
Assistant Examiner—James G. Smith
Attorney, Agent, or Firm—Robert R. Keegan

[57] ABSTRACT

There is disclosed a hand tool for drilling or performing other rotational operations on a work piece which is specially adapted for one-hand operation in that it consists of a small handle in which there is rotatably mounted a quill; the quill extends a sufficient distance from the front of the handle to permit it to be rotated between the thumb and forefinger while the handle is held in the palm of the hand with the other three fingers; a gripping surface is provided on the extending portion of the quill, and the quill is arranged to hold concentrically therewith a drill, tap or other tool which may be pressfit or otherwise secured in the quill. In one embodiment the drill or other twist tool is removably secured in the end of the quill by means of a tapered dart fitting a frog with a matching taper in the end of the quill. The quill is preferably removably held in the handle by a magnet or a ball-socket detent; with magnet retention a hard steel ball is preferably interposed between the end of the quill and the back of the handle to act as a thrust bearing, and guide means inside the handle guide the rear end of the quill to engage the bearing and for proper retention by the magnet or other detent mechanism. A substantially closed magnetic flux path is provided from the end of the quill through a portion of its length to the case of the handle and back through the handle to the portion thereof adjacent the end of the quill.

17 Claims, 5 Drawing Figures

TWIRL QUILL DRILL

Hand drills for rotating drill bits or other twist tools have characteristically been of 2 types. In one type the tool is held in one hand or supported by one hand while a rotational motion is imparted by the other hand, as in the "egg beater" type hand drill for example. A brace and bit operates on the same general principle. One-hand twist drill tools have been devised where a reciprocating motion of one hand is converted into a rotational motion of the drill, and typically there is a spring return.

While suitable for their primary purpose, these traditional forms of drills do not provide both precise control of the rotational motion together with control of the pressure applied to the twist tool, both of which are most desirable in doing fine work such as that required on delicate mechanical apparatus, in model making, etc.

The present invention provides a tool in which a great variety of twist tools can be used ranging from drills to taps to screwdrivers with very precise control and one-hand operation. The operator of this tool has the full feel of the resistance to rotational motion and the pressure applied to the point of the twist tool. This control and feel is achieved to a degree not heretofore possible with either hand or power tools.

Nevertheless, the basic mechanism is simple and thus inexpensive. A removable quill is rotatably mounted in the handle. The twist tool is mounted either permanently or removably in the forward end of the quill and concentric therewith; the quill is provided with a gripping surface for the thumb and forefinger. The twist motion of the quill is imparted by a natural motion of the thumb and forefinger similar to that naturally used in turning a knob on a radio or combination lock or similar device. This motion does not interfere with locating and orienting the twist tool by use of the grip provided by the remaining fingers of the hand and the palm of the hand. Simplicity of use of the tool can only be appreciated by actual operation, as it is almost impossible to explain in words.

It may be noted that tools for drilling or similar operations exist in substantial number where a drill or other tool is held in a chuck where it may be rotated by hand and in which there is a handle which may be held stationary in the other hand; an example of such a device is shown in U.S. Pat. No. 3,119,423 to H. H. Weick. The Weick device and other known devices are, however, not especially adapted to be held with three fingers and the palm in one hand while the twist tool holding portion is turned with the thumb and forefinger of the same hand, as in the present invention.

It is an object of the present invention to provide a small hand tool for drilling or similar operations which can be operated by one hand and which is subject to precise control.

It is another object of the present invention to provide a hand drill for fine work in which the drills or other tools are mounted in a quill in which the respective quills may be readily inserted in or removed from the drill.

It is still another object of the present invention to provide such a drill with quills which are retained in position by magnetic attraction.

It is a further object of the present invention to provide a hand drill including a small handle that is hollow to accomodate a quill mounted for free-rotation and containing at the front end thereof a drill bit or other rotating tool mounted coaxially therewith.

In addition to the objects and advantages described or suggested above, other objects and advantages will be apparent from consideration of the following description in conjunction with the appended drawings in which.

Figure 1:
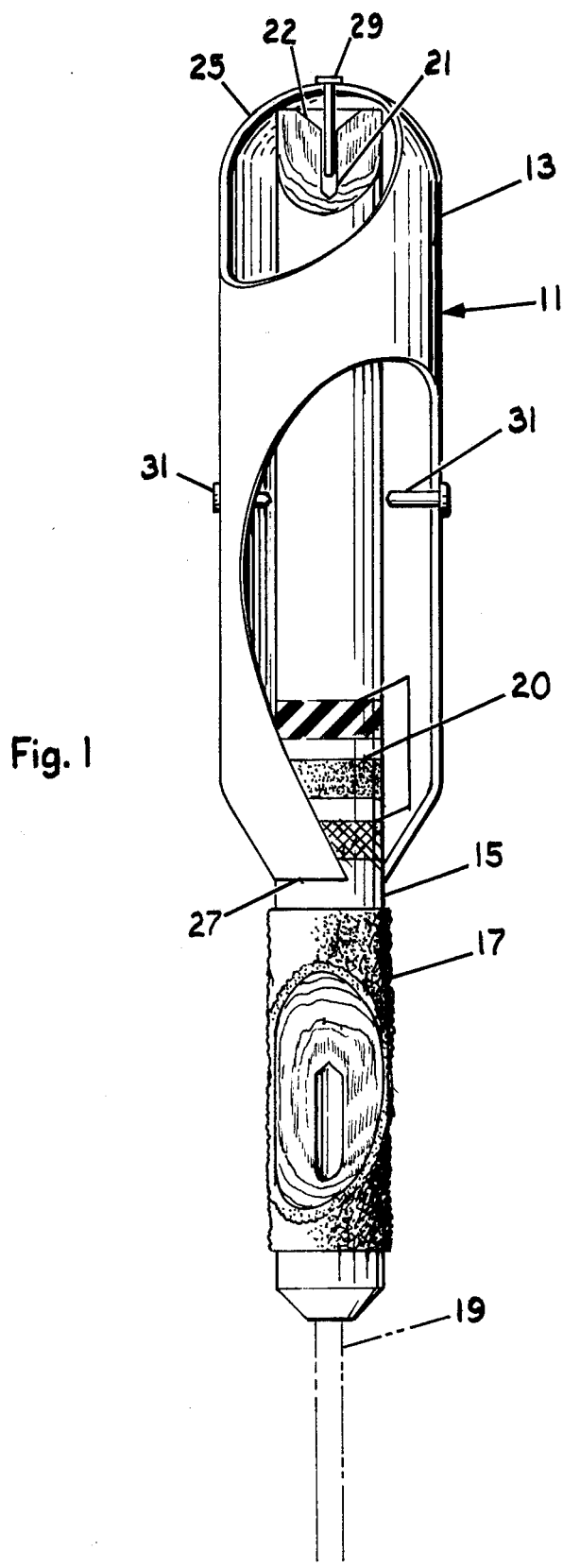
FIG. 1 is a vertical sectional view of a twirl quill drill in accordance with the invention.

Referring to FIG. 1, a simple version of a twirl quill drill according to the invention is shown at 11. The twirl quill drill includes a handle portion 13 and a quill 15.

In the lower end of the quill 15 as shown in FIG. 1, a drill bit 19 is mounted coaxially with the cylindrical quill 15. In this embodiment, the drill 19 is permanently secured in the quill 15 by being force fit and/or cemented in the axial opening in the quill 15.

The quill 15 is illustrated as made of wood in FIG. 1. This wood should preferably be straight grain hardwood dowel pin stock. It is desired to use an inexpensive material for the quill as it is contemplated that the user will wish to have a substantial number of quills with commonly used drill bits permanently secured therein. Other quills may be provided with pinvice-type chucks so that various sizes of drills may be mounted in such quills.

The wood dowel quills as illustrated in FIG. 1 may be provided with drill bits already mounted in the forward end or may be provided with a small, accurately centered pilot hole so that the user can mount a tool of his choice be enlarging the hole for a snug fit with the shank of the drill bit or other tool. The quill 15 may be provided with a protective coating of varnish, enamel, shellac, plastic or other coating medium to inhibit dimension changes which might occur due to moisture content change in the wood quill.

As illustrated in FIG. 1, the total length of the quill may be approximately 4 inches, and the part extending beyond the handle 13 may be a little over an inch. Diameter of the quill may be ⅜ inch.

As indicated at 17 in FIG. 1, the portion of the quill 15 extending from the handle 13 is provided with a gripping surface. The gripping surface 17 provides high friction contact for the thumb and forefinger to facilitate twirling the quill 15. This surface 17 may be formed by depositing fine granules such as sand on a cement coating on the desired portion of the quill surface. Other forms of gripping surfaces may be utilized such as rubber, plastic, knurled surfaces (particularly on metal) or the gripping surface may be omitted in certain instances.

Since the drill bit 19 will have the size marking hidden by being secured in quill 15, it is desirable to mark the quill with the size of the drill bit 19 or other tool which is secured therein. The preferred way of providing such markings is with color bands 20 which by an adaptation of the RETMA color code will readily identify the diameter of the drill bit or the identification number of the tool. The RETMA color code is a standardized code for electronic components in which a first color band indicates the most significant of 2 digits, another color band indicates the second digit, and a third color band gives a power of 10 multiplier for the 2-digit number identified by the other 2 bands. By way of example, the color code system could be based on micrometers, and the RETMA color code; a quill with 3 red bands would indicate a drill bit or other tool with a diameter of 2,200 micrometers or 2.2 millimeters. Alternatively, the drill size may be embossed, printed or otherwise applied to the quill in a conventional manner.

The handle 13 in FIG. 1 is illustratively shown slightly less than 3 inches in length and about ¾-inch in diameter. The handle is a hollow metal case, cylindrical in shape, and may be shaped substantially the same as a carbon dioxide cartridge case. Thus it may be formed on the same metal forming machinery as is used for $CO_2$ cartridges.

Handle 13 is provided with opening 27 at the front end to accept the quill 15. At the butt end of the handle 13 a pin 29 is secured extending to the interior of the handle on the axis thereof. Pin 29 engages a bore 21 in the top end of the quill 15 and acts as a bearing both for thrust forces and lateral forces. Pin 29 may be secured by welding or soldering and may be rounded-headed or ground flush with the curved spherical surface 25 of the end of the handle 13.

The end of quill 15 which contains the bore 21 is preferably provided with a conical depression 22 to aid in guiding the pin 29 into the bore 21. Guiding of the quill into place may also be facilitated by alignment pins 31, two of which are shown in FIG. 1. Preferably there would be four such alignment pins.

The following steps will be taken in using the twirl quill drill. A quill with the desired size drill bit or other tool is selected by reference to the color code on the quill or other identifying marking. The end of the quill opposite the drill bit is inserted through the front bearing opening 27 of the handle 13. As the quill is inserted into the handle it is easily manipulated to pass between alignment pins 31 and is thus guided so that the pin 29 strikes the upper end of the quill 13 in the conical depression 22 and is thus guided into bore 21.

Once the quill seats in the rear bearing, the handle is grasped with the cylinder's closed end 25 in the center of the palm of the right hand with the second, third and little fingers. At the same time the gripping surface 17 is grasped between the thumb and forefinger.

The point of the drill bit 19 is placed on the point marking the center of the hole to be drilled. This would usually have been marked in advance with a pencil or scribed crossmark. Pushing gently on the cylinder, turn the drill a few turns in the clockwise direction. The drill bit may then be lifted off the work to check the position of the center of the hole. Very fine corrections in the center hole may be made by leaning the drill and twisting it a few turns at a time. Once the center of the hole has been satisfactorily re-located, the hole may be finished by applying somewhat more force and twisting more rapidly.

The accuracy of the position and direction of the hole can be controlled remarkably well due to the simple and compact nature of the drill and the ability to hold the work close to one's eye (or place one's eye close to the work if it is clamped for drilling). In many cases the most convenient manner of operation will be to hold the work in the left hand. This ability to hand-hold the work is an outstanding advantage of the twirl quill drill, as the hand is the most sensitive and versatile holding mechanism that exists. Once the hole has been drilled with the twirl quill drill, the drill bit may be replaced with another quill containing a tap or other tool to perform further operations on the hole if desired.

From the above explanation it will be seen that the tool according to the present invention is of quite simple construction and utilizes components which are mass-produced and thus inexpensive; only comparatively simple modifications of readily available parts is required. In most cases the component could be obtained with modifications already made by the manufacturer.

The operation of the tool is simplicity itself, and the size, construction and mode of operation is inherently easy to learn and takes advantage of normal dexterity in performing holding and twisting operations. Since the invention requires no electric power, it has none of the hazards associated therewith. Thus it would be particularly suitable for use by children in pursuit of hobbies and school projects. Not only electrically powered tools but any sort of geared drill mechanism involves possibility of injury. This is due to the potential for causing injury before reaction time permits the injurious motion to be stopped. With the present tool there is no inertia or stored energy of any kind as in the coasting of wheels or the motion of the weight of a hammer or similar implement.

The only injury possible with the tool is that associated with any pointed object. Normally the point of a drill bit is not sufficiently sharp to penetrate the flesh with the modest forces involved with this tool. In all likelihood, the tool is safer than a lead pencil.

The twirl quill drill, since it is quite small, will occupy very little space in a tool box and can readily be be carried in a pocket. Even with a substantial collection of quills fitted with commonly used drill bits or other tools, it would occupy very little volume, substantially less than that of a power drill or even a gear-driven hand drill.

The speed with which the tool can be used is enhanced by the fact that commonly used drill bits or other tools need not be located, identified and placed in a chuck and tightened.

The very small size of the entire quill drill tool makes it most advantageous for reaching cramped quarters or drilling in places which simply could not be reached with any other drill. It is, in fact, small enough so that it would make accessible places that would otherwise require a flexible cable arrangement. While the particular quill illustrated in FIG. 1 is made quite short to minimize the overall length of the tool, one may make the quill much longer and thus achieve the effect of an extension drill.

The twirl quill drill will also be found useful, especially in very hard material, for the purpose of starting a hole with exceptional accuracy. Once the hole has been started, it may be completed with an electric power hand drill or drill press.

The heft, feel and control of the twirl quill drill permits the use of very small drill bits to produce tiny holes without the usual hazard of breaking such drills in the work. This recommends the tool for use in working with jewelery, models and similar very delicate work. Due to the low speed of the drill and the control of speed and pressure, heat-sensitive plastics may readily be drilled where melting of the plastic would gum a power drill and possibly seize and cause breaking of the work.

In delicate work it is even possible to drill with a finger of the left hand behind the piece to sense the first slight deformation of the work before the tool breaks through. Thus damage to the back surface in drilling can be completely avoided.

Holes can be drilled without a center punch thus making the tool most useful on finished articles and delicate apparatus and minimizes the drilling of the backside-mounted components of finished equipment after the punch through. Especially when the work is held in the left hand, drill chips from the work may very readily be caught in a small container and thus do not become distributed where they could damage surfaces or otherwise be a nuisance. Chips of precious metal can also thus be saved.

As there are virtually no flying chips from the tool, the work can be held as close to the eye as convenient and no bulky eye shield is necessary.

Figure 2:
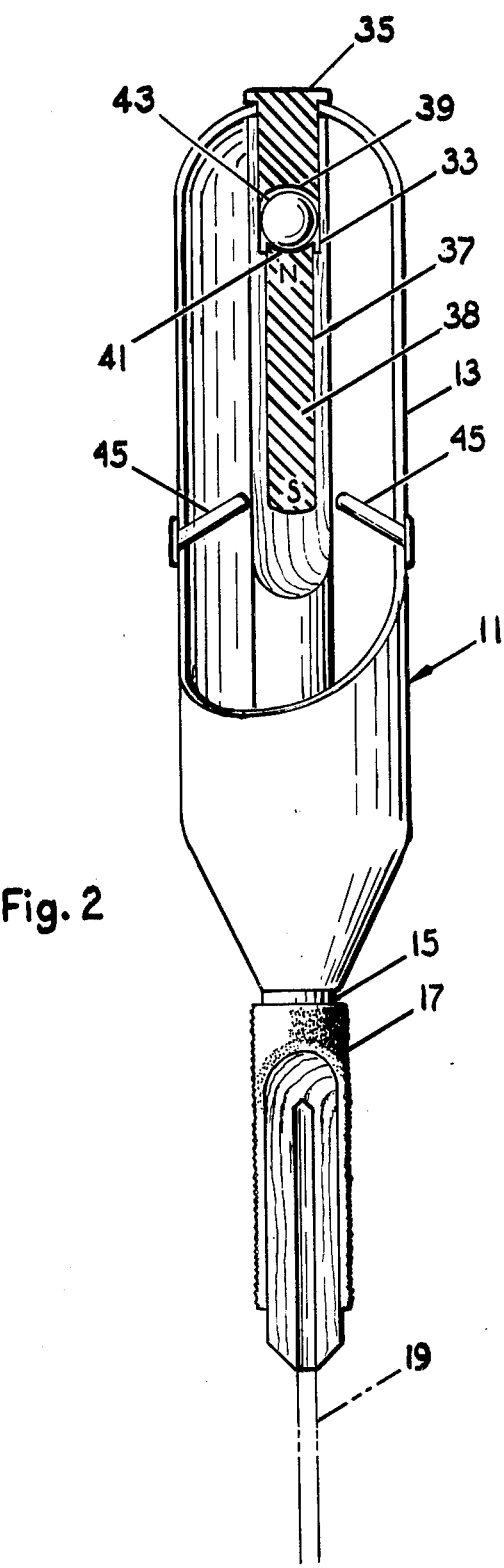
FIG. 2 is a vertical sectional view of an alternative form of twirl quill drill with magnetic retention and a ball thrust bearing.

FIG. 2 illustrates an embodiment of the invention which is generally similar to that of FIG. 1 but contains certain refinements thereover. In FIG. 2 the twirl quill drill again includes a handle 13, a quill 15 with a gripping surface 17, and an axially-mounted drill bit 19.

The top end of the quill 15 contains a bore 33 to accomodate a pin 35 in the butt end of the handle 13. The bore 33 and the pin 35 are larger in diameter than in the FIG. 1 embodiment. In the bottom of the bore 33 there is a hole 37 of slightly smaller diameter in which is secured a permanent magnet 38 of Alnico or similar material.

Pin 35 has on the lower portion a concave generally spherical surface 39. Magnet 38 is preferably but not necessarily provided with a similar concave generally spherical surface 41. A steel ball 43 is held in bore 33 by the attraction of magnet 38. Surfaces 39 and 41 have a radius slightly greater than the radius of ball 43, and consequently, the combination of the two surfaces 39 and 41 together with the ball 43 provide an effective thrust bearing for the quill 15.

At the same time the quill 15 is prevented from dropping out of the handle 13 by the magnetic attraction of magnet 38 on pin 35.

Alignment pins 45 are provided to aid in guiding the quill bore 33 over the pin 35. In FIG. 2 pins 45 are slanted toward the butt of the handle 13 so that the end of the quill 15 will thereby be guided through the opening between pins 45.

Pins 45 are preferably made of steel and provide a further function of completing a magnetic flux path for magnet 38, through steel ball 43, through pin 35, through the case of handle 13 to the pins 45, thence to the other pole of the magnet 38. It may be noted that this path contains relatively short air gaps and thus substantially increases the flux density and the holding power of the magnet 38 for retaining the quill in the handle 13. The magnetic force retaining quill 15 and handle 13 is sufficient to support the weight of the quill against gravity and to maintain the quill in the handle during normal manipulation of the tool.

At the same time, the force is not so great as to present any difficulty in removing the quill from the handle. Bearing pin 35 and alignment pins 45 may be secured in the case of handle 13 by welding, soldering, cementing or other suitable fastening procedures. In general, the construction features and operation of the twirl quill drill of FIG. 2 are as described in connection with FIG. 1 except as pointed out above.

In addition, the twirl quill drill of FIG. 2 has the advantage of the ball thrust bearing which reduces the effort required in twirling the quill, especially when substantial pressure is being applied to the drill bit or other tool. The twirl quill drill of FIG. 2 also has the magnet retention feature for added convenience.

Figure 3:
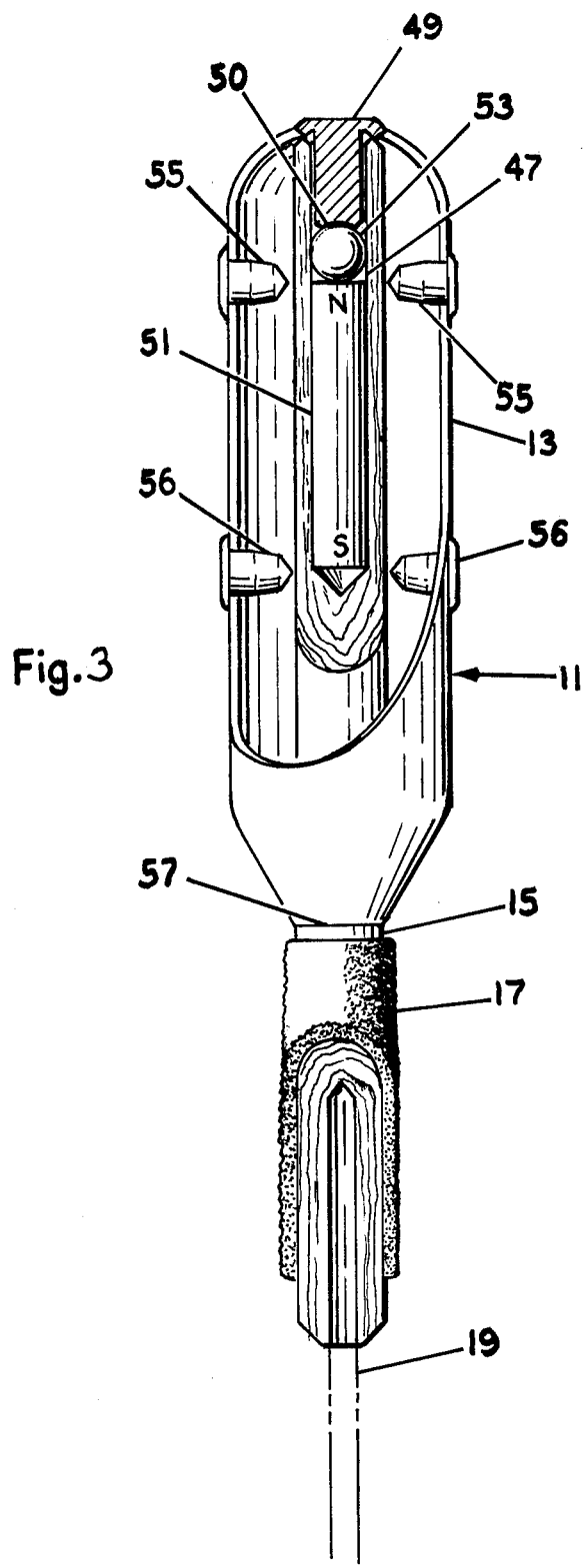
FIG. 3 is a vertical sectional view of a second alternative form of twirl quill drill with magnetic and non-magnetic alignment pins.

FIG. 3 illustrates another embodiment of the invention. In FIG. 3 the twirl quill drill 11 includes a handle 13, a quill 15 with a gripping surface 17, and an axially mounted drill bit 19. The top end of quill 15 has an axial bore 47 extending about one-third of the length of the quill 15. The outer end of the bore 47 engages a pin 49 which extends internally from the butt end of the handle and is secured in place by soldering, welding or other suitable procedure. In FIG. 3 the bore 47 has a diameter substantially smaller than the diameter of the quill 15, thus leaving thicker and stronger walls for engagement of pin 49. For example, bore 47 may be 5/32 inch is diameter, and quill 15 may be 5/16 inch in diameter. A strong cylindrical permanent magnet 51 occupies the bottom of the bore 47 and is press fit, cemented or otherwise secured in place. The magnet 51 may be an Alnico magnet. Retained in the bore 47 by magnet 51 is a steel ball 53.

Steel ball 53 acts as a thrust bearing element to reduce the turning friction for quill 15. The end surfaces of magnet 51 are both flat and are not cupped as illustrated in FIG. 2. This shape gives satisfactory performance and permits use of standard, readily available magnets without modification. Pin 49 is shown with a slightly concave end surface 50. The radius of the surface 50 should be slightly greater than the radius of steel ball 53. The contrasting concave and flat surfaces of the pin and magnet respectively give the magnet a decided advantage in retaining the ball when quill and handle are parted. Alternatively, the end of pin 59 may be substantially flat.

The end of pin 49 is slightly tapered or chamfered, thereby facilitating the engagement of quill 15 over pin 49. The upper end of quill 15 may also be provided with an internal taper as shown in FIG. 3.

Alignment pins 55 and 56 are provided to facilitate alignment of quill 15 so as to engage pin 49; alignment pins 55 are preferably made of brass or other non-magnetic material; alignment pins 56 are preferably made of magnetic material such as steel.

In placing quill 15 into handle 13 the steel ball 53 is placed in bore 47 if it is not already in place. The top of quill 15 is then inserted in the bearing opening 57 and about one-third of the way into the handle where it must pass between alignment pins 56. Alignment pins 56 are preferably four in number spaced at 90° around the handle 13. The alignment pins 56 are tapered to facilitate passage of the end of the quill 15 therebetween. Quill 15 may also be provided with an external taper at the top end to facilitate passage between pins 56. Approximate alignment being attained by reason of pins 56 the quill end readily passes between upper alignment pins 55 and is thereby guided to engage pin 49. Upon seating of the quill 15 it is held in place by magnetic attraction of pin 49 by magnet 51 through steel ball 53; a closed path with relatively narrow air gaps is provided for magnetic flux from the south pole of magnet 51, through alignment pins 56, upward through the case of handle 13 and back through thrust pin 49 and steel ball 53 to the north pole of magnet 51.

The operation of the twirl quill drill of FIG. 3 is similar to that described with respect to FIG. 1 except as noted above. The general construction and features of the twirl quill drill of FIG. 3 are also similar to the twirl quill drill of FIG. 2 except as noted above.

Figure 4:
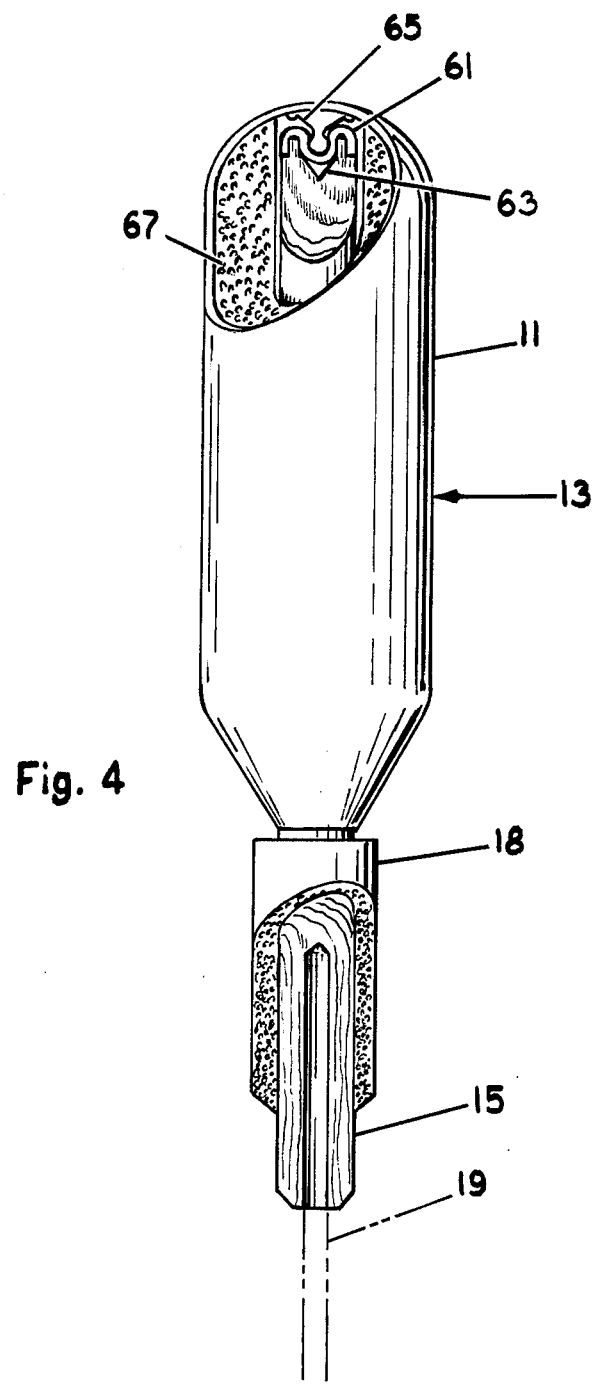
FIG. 4 is a vertical sectional view of a third alternative form of twirl quill drill with a non-magnetic detent according to the invention.

Referring to FIG. 4 a twirl quill drill 11 is shown in an alternative embodiment which differs by having a mechanical detent for retaining the quill in place.

The twirl quill drill of FIG. 4 includes a handle 13, a quill 15 and a gripping surface 18 on the lower end of quill 15.

Gripping surface 18 is formed of hard rubber and preferably the high resilience rubber used in the production of Super Balls. Such material is desirable due to its characteristic of maintaining good friction gripping properties even when the surface is not clean but is partially covered with dirt, oil or other material common to a shop environment.

The handle 13 in the FIG. 4 embodiment is somewhat shorter than that of FIGS. 1, 2 and 3. The quill 15 is also shorter with the result that the overall length of the twirl quill drill of FIG. 4 is less than 4½ inches, thus making it possible to use the drill in extremely cramped quarters.

With the smaller handle as illustrated in FIG. 4 it may be desirable to hold the quill drill somewhat differently. Rather than wrapping the second, third and little fingers around the handle, it is also possible to rest the butt of the handle in the palm of the hand near the heel of the palm, cradling the handle in the third and little fingers and gripping primarily with the thumb and forefinger at the gripping surface 18 of the quill 15.

The top of quill drill 15 has secured thereto a ball socket and detent 61. Ball socket and detent 61 may take the form of a fabric snap fastener (size 000, for example). The top of quill 15 is shaped with a depression 63 to accomodate the socket portion of the ball socket and detent 61 which may be secured to the top of the quill by cementing with epoxy or similar suitable adhesive.

A ball thrust bearing 65 is secured in the end of handle 13 and may take the form of a ball portion of a snap fastener mating with socket part 61. Ball thrust bearing 65 may likewise be cemented in position with epoxy cement or other adhesive.

As seen in FIG. 4 the ball thrust bearing 65 snaps into the ball socket and detent 61 and acts as a thrust bearing, guide bearing and mechanical latch for the quill 15.

The use of readily available snap fastener mechanisms for the bearing and detent mechanism of the twirl quill drill of FIG. 4 is a great advantage in reducing costs. If desired, however, the bearing and detent mechanism may be designed particularly for the twirl quill drill using harder, more wear-resistant materials. In particular the ball 65 may be made of hardened steel to reduce wear. Wear on the socket element 61 would be of less concern, as no single quill would likely incur significant wear, or in any event the socket could easily be replaced.

To guide the quill 15 for engagement of ball element 65 with socket element 61 the interior of handle 13 is filled with a body of foam material 67. The smaller version of the twirl quill drill illustrated in FIG. 4 has a quill diameter of ¼ inch, and the void in the form 67 to accomodate the quill 15 may be approximately 9/32nd to 5/16th inch in diameter. The operation of the twirl quill drill of FIG. 4 is similar to that described with respect to previously described embodiments. It is intended, however, for use with smaller size tools where friction and high torque are not factors. Due to its small size it is also particularly adapted for users with small hands. The bearing 61 may be lightly lubricated with oil to reduce rotating friction of the quill 15.

Figure 5:
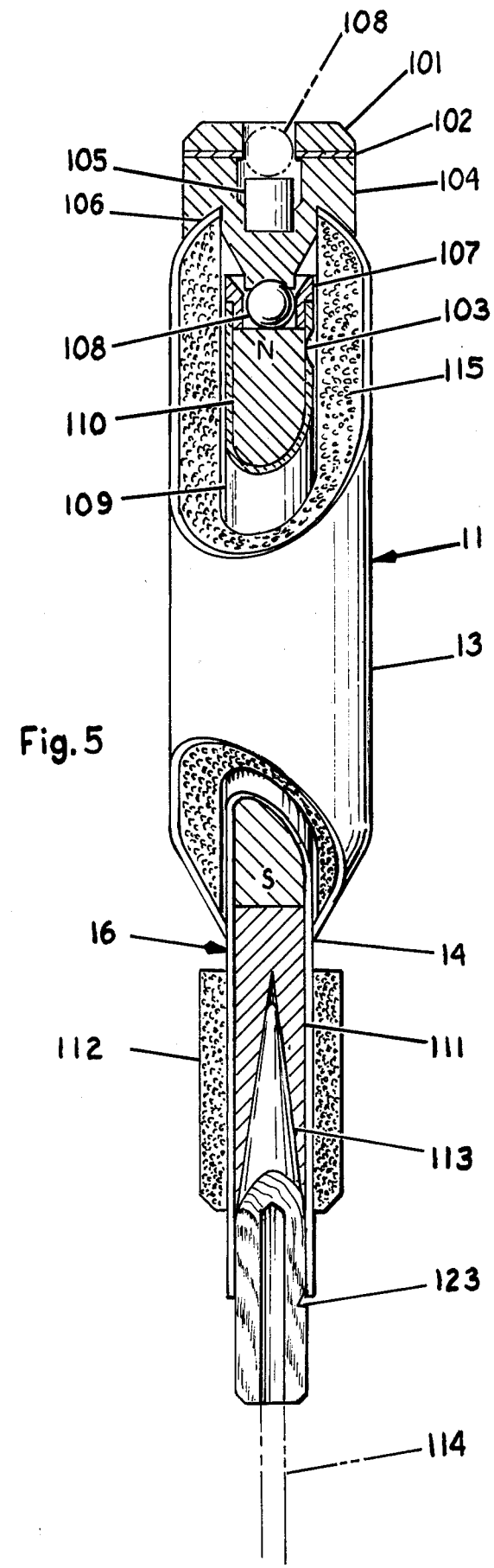
FIG. 5 is a vertical sectional view of a fourth alternative form of twirl quill drill with provision for exchanging drill bits in the quill.

Referring to FIG. 5, a multi-featured embodiment of a twirl quill drill is shown at 11 having a handle 13 which may be formed of the same material and of the same shape as a conventional $CO_2$ cylinder; it may thus be manufactured on the same production equipment with substantially the same methods. The handle 13 has a smooth opening 14 which accepts a quill 16 and forms a front bearing for the rotation of quill 16.

Quill 16 is formed of a body 109 which may be aluminum alloy tube with an outside diameter of 5/16 inch and an inside diameter of ¼ inch.

The tube 109 has secured therein a frog 111 of soft iron. The frog 111 is provided with a tapered opening which matches the taper of a dart 113. The dart 113 is thereby firmly frictionally engaged in the frog 111, yet is removable to change the tool in the drill. A drill bit or other tool is mounted in the dart 113 by being press fit, cemented or otherwise secured. The drill bit 114 is coaxial with the dart 113, the frog 111 and the quill body 109.

A notch 123 is provided in the dart 113 so that it may be removed by the leverage of a knifeblade or small screwdriver blade in the event the dart 113 is so tightly wedged in the frog 111 that it may not easily be removed by pulling with the thumb and forefinger.

The frog 111 also acts as a pole piece and provides a magnetic flux path as will be later more fully explained. Frog 111 may have an outside diameter of ¼ inch, a length of 1¼ inches and a taper of ¼ inch per inch. The external taper of dart 113 will of course be the same; its diameter may be ¼ inch and its length approximately 1½ inches.

The quill 16 is provided with a gripping portion 112 formed of high resilience rubber or plastic, preferably the plastic utilized for Super Ball products. The surface of this material tends to remain relatively clean and maintain high friction even with a film of dirt, moisture, oil or the like on the operator's finger.

The dart 113 is preferably formed of aluminum alloy, anodized and dyed with a color coding to indicate the tool number of drill diameter in the fashion described in connection with the description of FIG. 1.

At the top of quill 16 is a quill bearing element 107 which performs several functions. It aids in retainihg in place a magnet 110 which is positioned between frog 111 and bearing element 107. The magnet 110 may be an Alnico V magnet with an outside diameter of ¼ inch and a length of 1¾ inches with precision ground ends.

The quill bearing element 107 also acts as a cup to retain steel ball thrust bearing 108. Other functions of the quill bearing element will appear in the following explanation. The quill bearing element may have a major outside diameter of 5/16th inch, a minor outside diameter of ¼ inch, an inside diameter of 0.18 inch and an overall length of 0.2125 inches. It is preferably machined or otherwise formed from aluminum alloy or other long-wearing non-magnetic material.

The handle 13 is surmounted by a handle bearing structure 104 which also serves as a pole piece for the magnetic retention feature to be later explained. The bearing structure has a lower surface which is spherically concave to position steel ball 108. The minor outside diameter of bearing structure 104 is the same as steel ball 108, namely 0.175 inches. Bearing structure 104 tapers to an intermediate diameter of 11/32nd inches; the taper of bearing structure 104 matches an internal taper in the top of quill 16. The top surface 106 of handle 13 is provided with an opening to accept the intermediate diameter of bearing structure 104. Bearing structure 104 may have an overall diameter of 0.65 inches. The top of bearing structure 104 is provided with a cavity to accept the steel ball 108 with a diameter of ¼ inch. In that cavity there is secured a small magnet 105 which may be made of Alnico V with an outside diameter of 3/16th inch and a length of 0.20 inches. Magnet 105 is secured in place by cementing or otherwise, and bearing structure 104 may similarly by secured to the top surface 106 of handle 13 by epoxy cement or other suitable adhesive.

Preferably the interior of handle 13 is filled except for a void to accomodate quill 16 by a body of plastic foam 115. The inside diameter of the void in foam 115 may be approximately 11/32nd inch. The foam for foam body 115 is preferably a two-part expanding foam resin such as Craft Cast available from Edmund Scientific Company.

At the top of bearing structure 104 is a ring 102 of high-permeability magnetic material such as Hypernic. Ring 102 may be 0.028 inches thick with an outside diameter of 0.65 and an inside diameter of 0.18. Ring 102 may be secured in place by cementing with epoxy resin or other suitable adhesive.

An aluminum alloy cap 101 is secured at the top of the handle 13 and preferably has inside diameter and outside diameters corresponding to that of the ring 102. Its thickness may be approximatley 0.08 inches.

In FIG. 5 bearing structure 104, ring 102 and cap 101 form a magnetic ball keeper for the ball 108 when ball 108 is not being used as a low-friction thrust bearing. The flux path retaining ball 108 in the ball keeper formed by cap 101, ring 102 and bearing structure 104 is from the upper (north) pole of magnet 105, through the ball 108 shown in dashed lines to the high-permeability material of ring 102, down through the soft iron of bearing structure 104 and back to the lower (south) pole of magnet 105.

A spherical indentation 103 is provided in quill 16 near the end of magnet 110 which serves as a ball thief as later described. The overall dimension of the handle bearing structure and ball retainer secured to the top thereof is about 2½ inches. While the size of the handle is subject to considerable variation, it is preferred that the overall length of the handle be equal to or somewhat less than the width of the palm of the person who is to use the tool. A dimension of 2½ inches is only somewhat less than the average width of a man's palm, yet would not be substantially greater than the palm width of a woman or youth who might use the tool.

The embodiment of the tool illustrated in FIG. 5 is capable of two modes of operation. The first is the twirl mode, an operation similar to that of previously described embodiments of the tool. Ball 108 (which may be a precision ground B.B. shot as manufactured by Daisy Air Rifle or others) will be in place as shown in solid lines in FIG. 5. The combination of ball 108, the face of magnet 110 and the concave surface of bearing structure 104 will perform a triple function of rear guide bearing, thrust bearing and magnetic latch. These elements should never be lubricated in any way and should be kept free of iron filings by capturing them on the sticky side of masking tape or transparent tape.

High torque mode of operation is available by removing ball 108 and storing it in the retainer formed by elements 101, 102 and 105. In the high torque mode quill bearing element 107, being without ball bearing 108, slides up to engage the conical taper or bearing element 104 and is no longer free to turn without friction. In fact this now becomes a high friction coupling, and the tool may be used as a screwdriver or other non-slip tool.

If desired, the internal taper of element 107 and the external taper of element 104 may be splined with mating splines that provide direct rather than frictional coupling between handle 13 and quill 16 when ball 108 is not interposed between these two elements. Furthermore, the splines may be replaced with ratchet elements on either element 104 or 107 or both to provide a ratchet drive for quill 16 when ball 108 is removed.

Since the detailed operation of the tool of FIG. 5 may not be self-apparent, it will now be described, in particular with respect to conversion from the twirl mode of operation to the high friction or direct mode of operation.

Assuming that the tool is in the twirl configuration as illustrated in FIG. 5 and it is desired to use it as a high torque tool, the following steps would be employed.

The quill would be withdrawn from the cylinder by overcoming the attractive force of magnet 110. This is accomplished with the tool upright as shown in FIG. 5.

To remove the ball from the top of the quill, the quill is held upright and the magnetic material of the handle is used to attract the ball out of the top of the quill. The ball will drop into the hand which should be prepared to catch it. Alternatively, the tool may be inverted while the quill is withdrawn; the ball may pull out of the quill into the handle cavity and may be caught in the hand by tipping the handle opening down.

The ball is dropped into the ball retainer formed by elements 101, 102, 104 and 105 and is retained in the position shown in dashed lines in FIG. 5. The quill (without the ball) is then replaced in the cylinder where the conical surfaces of the quill 16 and the bearing structure 104 meet to provide a high friction connection permitting high torque to be imparted from handle 13 to quill 16 and thus to the tool such as drill bit 114 or some other tool such as a screwdriver, reamer, tap or the like.

To reverse the operation and convert the tool back to the twirl mode, the quill is first withdrawn from the handle. The indentation 103 is then used to function as a ball thief and recover ball 108 from the magnetic ball keeper. This is accomplished by holding the quill horizontal with the indentation 103 directly over the position of ball 108 shown in dashed lines in FIG. 5. The ball 108 is thereby pulled out of its keeper and will remain stuck to the quill.

The ball 108 is then removed by hand from indentation 103 and dropped in the cup formed by quill bearing element 107 where it is held by magnet 110.

Quill 16 with the ball replaced is then reinserted into handle 13 to use the tool in the twirl mode for operations requiring low or moderate torque application.

It should be noted that the ball 108 may be captured by either magnet 110 or by bearing element 104 depending on the shape of their surfaces and the resulting flux concentration at their interface with the ball. Generally the element surface with a radius of curvature nearest that of the ball will have the lesser flux concentration and will lose the ball to the other element.

From the foregoing explanation it will be seen that a tool is provided, in various embodiments, which has great versatility and provides capbilities not present in other small hand tools. In addition to the features and advantages described above, other modifications and variations of the tool will be apparent to those skilled in the art, and the scope of the invention is thus not to be deemed limited to the particular embodiments, modifications and variations described and suggested but is to be determined by reference to the appended claims.

What is claimed is:

1. A hand-held mechanism for holding and hand rotating a rotatable tool comprising
   a hollow handle, and
   a tool-holding quill having a forward end and a back end placeable in and removable from said handle and including means in said forward end for holding a rotatable tool,
   said quill having a size and shape relative to the hollow of said handle causing a rotatable relationship between said quill and said handle,
   said hollow handle including at least one lateral bearing element cooperating with said quill to restrain it against lateral movement while permitting rotation thereof,
   said quill when in place in said handle being of sufficient length relative to the hollow of said handle to provide a gripping section of said quill between the forward end of said handle and the forward end of said quill,
   whereby said mechanism may be held in one hand by the third, fourth or fifth fingers, and the quill may be hand-rotated by the thumb and forefinger of the same hand with a twirling action.

2. Apparatus as claimed in claim 1 wherein the length of said handle is not substantially greater than the width of an operator's hand.

3. Apparatus as claimed in claim 1 further including a thrust bearing element in said quill.

4. Apparatus as claimed in claim 1 wherein said gripping section has a high friction surface.

5. Apparatus as claimed in claim 1 wherein said quill is of elongated cylindrical shape.

6. Apparatus as claimed in claim 1 wherein said handle is of generally cylindrical shape.

7. Apparatus as claimed in claim 3 wherein said thrust bearing comprises a ball bearing having a ball.

8. Apparatus as claimed in claim 7 wherein said quill includes a permanent magnet and the ball of said ball bearing is retained by said magnet.

9. A hand-held mechanism for holding and hand rotating a rotatable tool comprising
   a hollow handle of generally cylindrical shape with a length not substantially greater than the width of an operator's hand;
   a tool-holding quill of elongated cylindrical shape having a forward end and a back end placeable in said handle and including means in said forward end for holding a rotatable tool, a thrust ball bearing in the back end thereof and a permanent magnet retaining the ball of said bearing in place; and
   at least one lateral bearing element in said hollow handle cooperating with said quill to restrain it against lateral movement while permitting rotation thereof;
   said quill when in place in said handle being of sufficient length relative to the hollow of said handle to provide a gripping section of said quill between the forward end of said handle and the forward end of said quill;
   whereby said tool-holding mechanism may be held in one hand by the third, fourth or fifth fingers and the quill may be hand-rotated by the thumb and forefinger of the same hand with a twirling action.

10. Apparatus as claimed in claim 9 wherein said handle is at least partially of magnetic material and includes structure for completing a magnetic flux circuit extending through portions of said handle and said quill.

11. Apparatus as claimed in claim 10 further including means in said handle for guiding said quill back end into said lateral bearing element.

12. A hand-held mechanism for holding and hand rotating a rotatable tool comprising
    a hollow handle, and
    a tool-holding quill having a forward end and a back end placeable in and removable from said handle and including means in said forward end for holding a rotatable tool,
    said hollow handle including at least one lateral bearing element cooperating with said quill to restrain it against lateral movement while permitting rotation thereof,
    said quill when in place in said handle being of sufficient length relative to the hollow of said handle to provide a gripping section of said quill between the forward end of said handle and the forward end of said quill,
    said quill including a permanent magnet for removably retaining it in said handle,
    whereby said mechanism may be held in one hand by the third, fourth, or fifth fingers, and the quill may be hand-rotated by the thumb and forefinger of the same hand with a twirling action.

13. Apparatus as claimed in claim 12 wherein said handle is at least partially of magnetic material and includes structure for completing a magnetic flux circuit extending through portions of said handle and said quill.

14. Apparatus as claimed in claim 12 wherein the length of said handle is not substantially greater than the width of an operator's hand.

15. Apparatus as claimed in claim 12 further including a thrust bearing element in said quill.

16. Apparatus as claimed in claim 15 wherein said thrust bearing comprises a ball bearing having a ball.

17. Apparatus as claimed in claim 16 wherein said quill includes a permanent magnet and the ball of said ball bearing is retained by said magnet.

* * * * *